United States Patent [19]

Sturgeon

[11] Patent Number: 5,440,472
[45] Date of Patent: Aug. 8, 1995

[54] INTEGRATED MAGNETIC POWER CONVERTER

[75] Inventor: Clayton L. Sturgeon, Lowell, Mass.
[73] Assignee: Powercube Corporation, Billerica, Mass.
[21] Appl. No.: 195,869
[22] Filed: Feb. 14, 1994
[51] Int. Cl.⁶ .......................................... H02M 3/335
[52] U.S. Cl. ........................................ 363/20; 363/131
[58] Field of Search ................. 363/41, 123, 131, 20, 363/137, 171, 24, 16, 101; 323/344, 259

[56] References Cited

U.S. PATENT DOCUMENTS

| | | | |
|---|---|---|---|
| 3,553,620 | 12/1967 | Cielo et al. | 336/165 |
| 3,694,726 | 9/1972 | Cielo et al. | 321/2 |
| 4,184,197 | 1/1980 | Cuk et al. | 363/16 |
| 4,186,437 | 1/1980 | Cuk | 363/16 |
| 4,257,087 | 3/1981 | Cuk | 363/16 |
| 4,262,328 | 4/1981 | Bloom et al. | 363/16 |
| 4,274,133 | 6/1981 | Cuk et al. | 363/39 |
| 4,355,352 | 10/1982 | Bloom et al. | 363/16 |
| 4,675,796 | 6/1987 | Gautherin et al. | 363/20 |
| 4,734,839 | 3/1988 | Barthold | 363/16 |
| 4,774,649 | 9/1988 | Archer | 363/20 |
| 4,821,163 | 4/1989 | Bloom | 363/49 |
| 4,853,668 | 8/1989 | Bloom | 336/214 |
| 4,858,093 | 8/1989 | Sturgeon | 363/20 |
| 4,864,478 | 9/1989 | Bloom | 363/16 |
| 4,969,081 | 11/1990 | Shekhawat et al. | 363/56 |
| 4,994,952 | 2/1991 | Silva et al. | 363/56 |
| 5,208,739 | 5/1993 | Sturgeon | 363/24 |

OTHER PUBLICATIONS

Cuk, Slobodan, "A New Zero-Ripple Switching DC-to-DC Converter and Integrated Magnetics," *Advances in Switched-Mode Power Conversion*, vols. I and II, Jun. 16-20, 1980, pp. 485-496.
Cocconi, Alan and Cuk, Slobodan, "Design of a 2KW, 100 KHz Switching Regulator for Space Shuttle," *Proceedings of the Fifth International PCI '82 Conference*, Sep. 28-30, 1982, pp. 195-210.
Cuk, Slobodan, "Coupled-Inductor and Integrated Magnetics Techniques in Power Electronics," *Advances in Switched-Mode Power Conversion*, vol. III, Oct. 18-21, 1983, pp. 347-353.
Severns, Rudolf P., Bloom, Gordon (Ed), "Converters with Integrated Magnetics," Chapter 12, *Modern DC-to-DC Switchmode Power Converter Circuits*, Van Nostrand Reinhold Company, 1985, pp. 262-324.
Bloom, Ed, "Core Selection for & Design Aspects of an Integrated-Magnetic Forward Converter," Mar. 3, 1986, pp. 1-10.
Bloom, Ed, "New Integrated-Magnetic DC/DC Power Converter Circuit & Systems," *1987 IEEE Applied Power Electronics Conference*, Mar. 1987, pp. 57-66.
Bloom, Ed, "New integrated-magnetic dc-dc power converter circuits and systems," *Powertechnics Magazine*, Mar. 1987, pp. 33-38.
Cuk, Slobodan, "Integrated Magnetics Versus Conventional Power Filetering," IEEE, 1987, pp. 61-72.
Severns, Rudy, "High Frequency Converters with Non Pulsating Input and Output Currents," *Technical Papers of the Fifth International High Frequency Power Conversion 1990 Conference*, May 6-11, 1990, pp. 223-234.

*Primary Examiner*—Peter S. Wong
*Assistant Examiner*—Shawn Riley
*Attorney, Agent, or Firm*—Ross, Clapp, Korn & Montgomery

[57] ABSTRACT

An integrated magnetic power converter for supplying power to a load includes a continuous magnetic structure having first and second oppositely disposed legs, and third and fourth oppositely disposed legs and a magnetic path therebetween. A first winding is wound on the first leg. A second winding is wound on the second leg and is connected to the load. A third winding in series with the second winding is wound on the first leg. A fourth winding is wound on the third leg and is connected to an energy source for supplying power to the converter. A fifth winding is connected in series with the fourth winding and is wound on the fourth leg. A first circuit is connected to the first winding for supplying energy to the first winding, such that when energy is supplied to the first winding, energy is transferred via the second and third windings to the load. A second circuit is connected to the fifth winding for supplying energy to the first circuit and for storing energy, the stored energy is supplied to the first winding for transfer to the load.

2 Claims, 1 Drawing Sheet

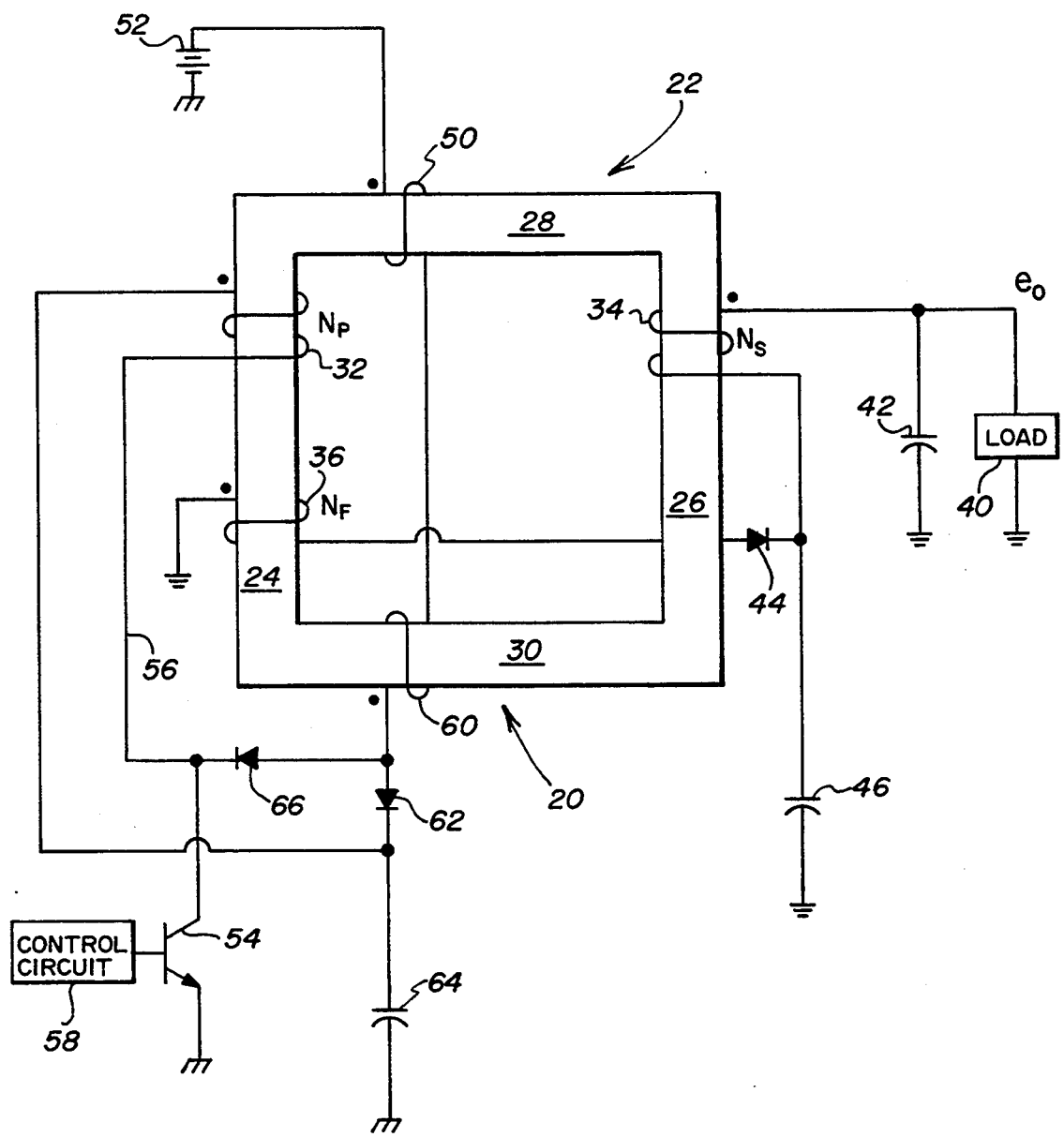

INTEGRATED MAGNETIC POWER CONVERTER

TECHNICAL FIELD OF THE INVENTION

This invention relates to power systems and devices, and more particularly to a combined multiple function integrated magnetic power converter.

BACKGROUND OF THE INVENTION

The combination of inductive elements and transformer elements of a power converter on a single core structure is referred to as magnetic integration. The consolidated magnetic system, if integrated properly, has the desired characteristics of the original converter circuit. In many instances, magnetic integration will also produce a converter arrangement which achieves reduced voltage stress on semiconductors. Various integrated magnetic power converter circuits and systems have been suggested, such as described in U.S. Pat. Nos. 4,858,093 and 5,208,739, the descriptions of which are hereby incorporated by reference.

A need has arisen for an integrated magnetic power converter with improved gain capability for power factor correction and power converter applications. Additionally, a need has arisen for an integrated magnetic power converter combining multiple magnetic topologies such as, for example, boost, buck-boost, and buck functions onto a single magnetic core, thereby achieving low core loss, minimal output ripple, high gain, reduced core size, and increased power output.

SUMMARY OF THE INVENTION

In accordance with the present invention, an integrated magnetic power converter for supplying power to a load is provided. The power converter includes a continuous magnetic structure having first and second oppositely disposed legs, and third and fourth oppositely disposed legs and a magnetic path therebetween. A first winding is wound on the first leg. A second winding is wound on the second leg and is connected to the load. A third winding in series with the second winding is wound on the first leg. A fourth winding is wound on the third leg and is connected to an energy source for supplying power to the converter. A fifth winding is connected in series with the fourth winding and is wound on the fourth leg. A first circuit is connected to the first winding for supplying energy to the first winding, such that when energy is supplied to the first winding, energy is transferred via the second and third windings to the load. A second circuit is connected to the fifth winding for supplying energy to the first circuit and for storing energy, the stored energy is supplied to the first winding for transfer to the load.

BRIEF DESCRIPTION OF THE DRAWING

For a more complete understanding of the present invention and for further advantages thereof, reference is now made to the following Description of the Preferred Embodiments taken in conjunction with the accompanying Drawing which is a schematic and electrical circuit diagram of an integrated magnetic power converter in accordance with the present invention.

DESCRIPTION OF THE PREFERRED EMBODIMENTS

Referring to the FIGURE, an integrated magnetic power converter in accordance with the present invention is illustrated, and is generally identified by the numeral 20. Integrated magnetic power converter 20 combines three separate magnetic structures, boost, buck-boost, and buck structures on a single magnetic structure having a continuous core, generally identified by the numeral 22, of magnetic material. Core 22 includes a first leg 24, a second leg 26, a third leg 28 and a fourth leg 30. Core 22 may be shaped, for example, in the form or a toroid.

A primary winding 32 is wound around leg 24. A first secondary winding 34 is wound around leg 26, and a second secondary winding 36 is wound around leg 24. Secondary windings 34 and 36 are connected in series around core 22. The manner in which the windings of primary and secondary windings, 32, 34, and 36, respectively, are wound on their respective legs to illustrate their respective polarities is according to the dot notation. Primary winding 32 is wound in the same direction as secondary winding 36 around leg 24.

The output of first secondary winding 34 is coupled to a load 40 which is connected between the output of first secondary winding 34 and ground potential. Connected across load 40 is a filtering capacitor 42. In series with secondary windings 34 and 36 is a diode 44. A capacitor 46 is in parallel with diode 44 and winding 36.

A winding 50 is wound around leg 28. Winding 50 is interconnected to a power source 52 which supplies input power to converter 20. Power source 52 may comprise, for example, a DC source which is converted into an AC signal through operation of a switch 54 which is serially connected to the output of primary winding 32 by signal line 56. Switch 54 may comprise, for example, a transistor whose collector is connected to the output of primary winding 32, the emitter at ground potential and the base connected to a control circuit 58. Control circuit 58 may be of a conventional form for detecting variations across load 40 and for providing appropriate regulation control output signals to switch 54. Control circuit 58 may comprise, for example, a pulse width modulator.

Interconnected in series with winding 50 is a winding 60 which is wound around leg 30. Windings 50 and 60 operate in complete independence from windings 32, 34, and 36. The inductances in core 22 created by windings 50 and 60 add, and the flux cancels thereby windings 50 and 60 operate independently of windings 32, 34 and 36. Connected in series with winding 60 is a diode 62 and capacitor 64. Interconnected between winding 60 and signal line 56 is a diode 66.

The operation of the present power converter 20 will now be described. When switch 54 is on, energy is transferred from power source 52 and stored magnetically via windings 50 and 60. Simultaneously, energy is supplied to primary winding 32 from capacitor 64. Energy is simultaneously transferred from primary winding 32 via secondary winding 34 to load 40. When switch 54 is on, energy is stored in the inductance formed by windings 50 and 60 and energy is removed from capacitor 64.

During the off-time interval of switch 54, the winding polarities of primary winding 32 and secondary winding 36 reverse, and diode 66 is back biased. Energy previously stored in the inductance of windings 50 and 60 is now stored in capacitor 64. This stored energy creates boost voltage from which energy is then supplied to winding 32 when switch 54 is on. When switch 54 is off, energy is supplied to load 40 and capacitor 46 via secondary winding 34, diode 44 and secondary winding 36.

It therefore can be seen that the present integrated magnetic power converter combines the previously required for boost, buck-boost, and buck in a single magnetic core and provides for low core losses resulting in high efficiency, and minimizes output ripple with improved power output.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. An integrated magnetic power converter for supplying power to a load comprising:

a continuous magnetic structure having first and second oppositely disposed legs and third and fourth oppositely disposed legs and a magnetic path therebetween;

a first winding wound on said first leg;

a second winding wound on said second leg and connected to the load;

a third winding in series with said second winding and wound on said first leg;

a fourth winding wound on said third leg and being connected to an energy source for supplying power to the converter;

a fifth winding in series with said fourth winding and wound on said fourth leg;

first circuit means operable between an active and inactive state and being connected to said first winding for supplying energy to said first winding when said first circuit means is activated, such that when energy is supplied to said first winding, energy is transferred via said second and said third windings to the load;

second circuit means connected to said fifth winding for supplying energy to said first circuit means and for storing energy, such that when said first circuit means is inactive, energy is stored in said second circuit means and when said first circuit means is activated, said stored energy is transferred to said first winding from said second circuit means; and third circuit means connected to said second winding for storing energy when said first circuit means is inactive and for transferring said stored energy to the load when said first circuit means is inactive or active.

2. The power converter of claim 1 wherein said second circuit means includes a capacitor for storing energy stored in said fourth and fifth windings.

* * * * *